UNITED STATES PATENT OFFICE.

JAMES W. ROBERTSON, OF DETROIT, MICHIGAN.

PROCESS OF PREPARING CEREALS.

SPECIFICATION forming part of Letters Patent No. 349,812, dated September 28, 1886.

Application filed December 12, 1885. Serial No. 185,501. (Specimens.)

*To all whom it may concern:*

Be it known that I, JAMES W. ROBERTSON, a citizen of the United States, residing at Detroit, in the county of Wayne and State of Michigan, have invented certain new and useful Improvements in Prepared Cereals; and I do declare the following to be a full, clear, and exact description of the invention, such as will enable others skilled in the art to which it appertains to make and use the same.

My present invention consists in the compound process, as hereinafter set forth, whereby I am enabled to produce from corn new and improved nutritive products, obtaining it from the cereal known by the following names of corn, "Indian corn," or "hominy," and producing a new nutritive product, the same being white, tender, curled, and fluffy, and which is not subjected to the heat of water or steam in its preparation, and will keep in any climate. I use only the purified granular product, from which the hulls and all impurities have been previously removed by subjecting the kernels to a suitable cracking and hulling mill, by which the impurities and hulls are effectually removed, leaving the granular or cracked portions clean, all of which may be accomplished in any of the well-known mills for doing such work. I then place the purified hard granules in a suitable basin or tank of cold water, putting in plenty of water to completely soften and bleach the granules, leaving the granules in the water until they have enlarged and become quite soft. I then draw the water out of the tank and pass the damp soaked particles of corn through a curling-mill, whereby the corn particles are formed into curled granules, being tender, white, and fluffy. The mill I employ constitutes another invention of mine, and need not be herein set forth. The curled granules are then placed upon screens or perforated supports and subjected to a current of air, whereby the moisture is soon evaporated, leaving dry, tender, white, curled granules, which are essentially the same as the germinal portion of the grain.

It has been common heretofore to subject the hulled portions of the corn to a steaming, which toughens the granules. Said steaming also draws the starch from the product. I overcome these objections by soaking the granules in a vat of cold water, leaving the particles perfectly tender and sweet.

As I do not subject the corn in its preparation to a steaming or heating, as is common, I am enabled to produce a nutritive product having a larger percentage of its natural qualities. To enable its keeping, I pass it through a curling-mill, so that it will be light and porous, resembling largely white popped corn. This curled condition prevents it from packing, allowing the air to freely pass through it, thus making an article that will keep in any climate.

I am fully aware that heretofore corn has been cracked, hulled, and steamed, and claim neither of those processes. I claim this compound process only when combined with the step of soaking in cold water without steaming, and passing through a curling-mill while damp the soaked particles, then drying, as herein specified. By said steps my process is distinguished from any other for the preparation of corn, whereby I am enabled to produce the curled nutritive product. This product may be cooked and eaten the same as hominy or oatmeal, makes an excellent mush and good griddle-cakes.

Having thus fully set forth my present invention, what I claim as new, and desire to secure by Letters Patent, is—

The process herein specified of making evaporated, tender, curled granules from corn for the procuring of a nutritive product, which process consists as follows, viz: crushing the corn in a dry state and separating the hulls therefrom; second, soaking in cold water the hulless portions to soften and prepare for curling; third, passing the soaked particles while damp through a suitable mill, curling the same; fourth, evaporating the moisture from the curled product, leaving white, unsteamed, tender, curled granules.

In testimony whereof I affix my signature in presence of two witnesses.

JAMES W. ROBERTSON.

Witnesses:
R. B. WHEELER,
C. W. RUSSELL.